US012713195B2

(12) United States Patent
Huang et al.

(10) Patent No.: US 12,713,195 B2
(45) Date of Patent: Aug. 18, 2026

(54) AUDIO SIGNAL PROCESSING METHOD AND APPARATUS

(71) Applicant: BEIJING ZITIAO NETWORK TECHNOLOGY CO., LTD., Beijing (CN)

(72) Inventors: Chuanzeng Huang, Beijing (CN); Junjie Shi, Beijing (CN); Xuzhou Ye, Beijing (CN); Zhengpu Zhang, Beijing (CN); Derong Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 260 days.

(21) Appl. No.: 18/440,039

(22) Filed: Feb. 13, 2024

(65) Prior Publication Data

US 2024/0251216 A1 Jul. 25, 2024

Related U.S. Application Data

(63) Continuation of application No. PCT/CN2022/114219, filed on Aug. 23, 2022.

(30) Foreign Application Priority Data

Aug. 24, 2021 (WO) ................ PCT/CN2021/114366

(51) Int. Cl.

*G06F 3/16* (2006.01)
*H04S 7/00* (2006.01)

(52) U.S. Cl.

CPC ................ *H04S 7/30* (2013.01); *G06F 3/162* (2013.01); *H04S 2400/11* (2013.01)

(58) Field of Classification Search

None

See application file for complete search history.

(56) References Cited

U.S. PATENT DOCUMENTS 8,868,585 B2 * 10/2014 Miyajima ............... G06F 16/58 707/758
2014/0236987 A1 * 8/2014 Liu ....................... G06F 16/683 707/769
2019/0007754 A1 * 1/2019 Master ............... H04N 21/8547

FOREIGN PATENT DOCUMENTS

CN 1771492 A 5/2006
CN 102007532 A 4/2011
CN 109791770 A 5/2019

(Continued)

OTHER PUBLICATIONS

International Search Report and Written Opinion for International Application No. PCT/CN2022/114219, mailed on Nov. 28, 2022, 14 Pages.

*Primary Examiner* — Quynh H Nguyen

(74) *Attorney, Agent, or Firm* — Astute IP Law Group

(57) ABSTRACT

The present disclosure relates to the technical field of data processing, and relates to an audio signal processing method and apparatus. The processing method includes: acquiring first audio metadata of an audio signal in an ADM, the first audio metadata corresponding to a first metadata part; acquiring second audio metadata of an audio signal that does not exist in the ADM, the second audio metadata corresponding to a second metadata part; and performing audio rendering on the audio signal according to the first metadata part and the second metadata part.

19 Claims, 6 Drawing Sheets

(56) References Cited

FOREIGN PATENT DOCUMENTS

| | | |
|---|---|---|
| CN | 111712875 A | 9/2020 |
| CN | 112400204 A | 2/2021 |

* cited by examiner

AUDIO SIGNAL PROCESSING METHOD AND APPARATUS

CROSS-REFERENCE TO RELATED APPLICATIONS

The present disclosure is based on and claims priority of PCT/CN2021/114366, filed on Aug. 24, 2021, the disclosure of which is hereby incorporated into this disclosure by reference in its entirety.

TECHNICAL FIELD

This disclosure relates to the field of data processing technology, particularly to an audio signal processing method, an audio signal processing apparatus, a chip, a non-transitory computer-readable storage medium, a computer program product, and a computer program.

BACKGROUND

Metadata is structured data used to describe the asset payload of multimedia (such as audio data), which is used to assist in the entire multimedia flow of audio production edition (Recording Edition), content contribution (Contribution), transport distribution, and consumption presentation. A standardized metadata system is critical to build efficient and high quality automated multimedia production and consumption systems, and benefits consistency and interactivity of the content, as well as compatibility and interoperability between different stages of content production and consumption.

In related arts, to support the new generation of spatial 3D audio, the International Telecommunication Union (ITU) develops the ITU BS2076 (an audio data model standard) to standardize the metadata representation of 3D audio content.

SUMMARY

According to some embodiments of the present disclosure, there is provided an audio signal processing method, comprising: obtaining first audio metadata of an audio signal comprised in an Audio Definition Model (ADM), wherein the first audio metadata corresponds to a first metadata portion; obtaining second audio metadata of the audio signal not comprised in the ADM, wherein the second audio metadata corresponds to a second metadata portion; preforming audio rendering processing on the audio signal according to the first metadata portion and the second metadata portion.

According to some embodiments of the present disclosure, there is provided an audio signal processing method, comprising: storing the first audio metadata obtained by a first data management module in a first metadata chunk, wherein the first data management module is an ADM module; storing the second audio metadata obtained by a second data management module in a second metadata chunk, wherein the second data management module is different from the first data management module; determining comprehensive audio metadata based on the first metadata chunk and the second metadata chunk.

According to still other embodiments of the present disclosure, there is provided an audio signal processing apparatus, comprising: an acquisition unit for acquiring first audio metadata of an audio signal comprised in an Audio Definition Model (ADM), wherein the first audio metadata corresponds to a first metadata portion, and acquiring second audio metadata of the audio signal not comprised in the ADM, wherein the second audio metadata corresponds to a second metadata portion; a processing unit for preforming audio rendering processing on the audio signal according to the first metadata portion and the second metadata portion.

According to still other embodiments of the present disclosure, there is provided an audio signal processing apparatus, comprising: a first memory for storing, in a first metadata portion, the first audio metadata of the audio signal in the ADM; a second memory for storing, in a second metadata portion, the acquired second audio metadata of the audio signal; a processor for preforming audio rendering processing on the audio signal according to the first metadata portion and the second metadata portion.

According to further embodiments of the present disclosure, there is provided a chip, comprising: at least one processor, and at least one interface for providing computer executable instructions to the at least one processor, wherein the at least one processor is used to execute the computer executable instructions to implement the audio signal processing method according to any of the above embodiments.

According to further embodiments of the present disclosure, there is provided a computer program, comprising: instructions that, when executed by a processor, cause the processor to perform the audio signal processing method of any embodiment of the present disclosure.

According to further embodiments of the present disclosure, there is provided an electronic device comprising: a memory; a processor coupled to the memory, the processor configured to, based on instructions stored in the memory, carry out the audio signal processing method according to any one of the above embodiments.

According to still further embodiments of the present disclosure, there is provided a computer readable storage medium having stored thereon a computer program that, when executed by a processor, implements the audio signal processing method according to any one of the above embodiments.

According to still further embodiments of the present disclosure, there is provided a computer program product comprising instructions that, when executed by a processor, implement the audio signal processing method according to any of the above embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof. In the drawings.

DETAILED DESCRIPTION

Figure 1:
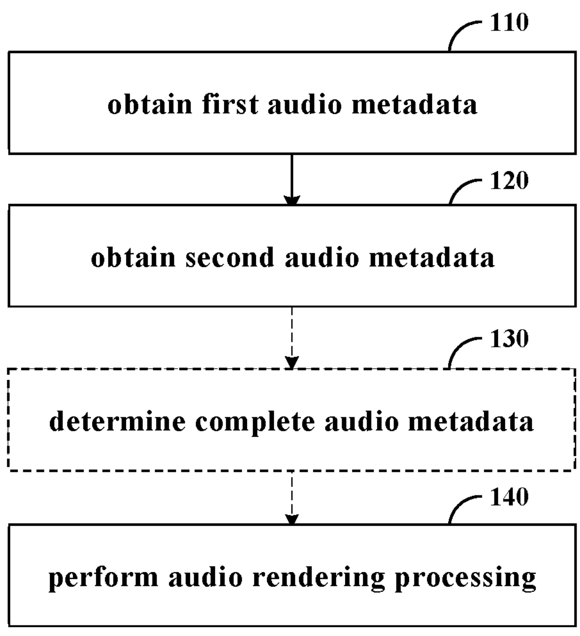
FIG. 1 shows a flowchart of an audio signal processing method according to some embodiments of the present disclosure.

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by persons of ordinary skill in the art based on the embodiments of the present disclosure without creative efforts shall fall within the protection scope of the present disclosure.

Unless otherwise specified, the relative arrangement, numerical expressions and values of the components and steps set forth in these examples do not limit the scope of the invention. At the same time, it should be understood that, for ease of description, the dimensions of the various parts shown in the drawings are not drawn to actual proportions. Techniques, methods, and apparatus known to those of ordinary skill in the relevant art may not be discussed in detail, but where appropriate, these techniques, methods, and apparatuses should be considered as part of the specification. Of all the examples shown and discussed herein, any specific value should be construed as merely illustrative and not as a limitation. Thus, other examples of exemplary embodiments may have different values. Notice that, similar reference numerals and letters are denoted by the like in the accompanying drawings, and therefore, once an item is defined in a drawing, there is no need for further discussion in the accompanying drawings.

In the development of a new generation of audio rendering technology, the existing audio metadata models have a technical problem of unclear range of data supported, resulting in limited interoperability of 3D audio produced. In addition, the difficulty of metadata extension makes it difficult to update rendering and content production systems.

Therefore, there are the following technical problems that need to be addressed: the structured metadata used to describe the 3D audio production and rendering stages; details of metadata system design (BDMD), metadata attributes and sub-elements; the way of applying metadata in a rendering engine.

In view of the above technical problems, the metadata system disclosed in this disclosure adopts a layered design that supports the <audioformatExtended> chunk of the BS.2076 standard and a customized <bdext> chunk (i.e., the <VRext> chunk). In this way, the metadata system can achieve forward compatibility with the <audioformatExtended> chunk and backward extension with the <bdext> chunk. Thus, the requirements for metadata standardization can be satisfied while providing flexibility and powerful presentation capabilities for the next generation of 3D audio systems.

FIG. 1 shows a flowchart of an audio signal processing method according to some embodiments of the present disclosure.

As shown in FIG. 1, in the step 110, first audio metadata of an audio signal comprised in an Audio Definition Model (ADM) is obtained, wherein the first audio metadata corresponds to a first metadata portion. For example, first audio metadata of an audio signal obtained by a first data management module is stored in a first metadata portion, wherein the first data management module is an ADM module. For example, the first metadata portion is the <audioformatExtended> chunk of the BS.2076 standard.

In some embodiments, a portion of the first audio metadata related to audio content is obtained from a first storage area; a portion of the first audio metadata unrelated to audio content is obtained from a second storage area. For example, the first storage area is a local storage area, and the second storage area is a remote storage area.

In some embodiments, the remote storage area provides offline update capability for storing a common data portion of audio control metadata.

In some embodiments, the portion of the first audio metadata unrelated to audio content comprises at least one of audioControl metadata or audioFormat metadata.

In some embodiments, the portion of the first audio metadata related to audio content comprises at least one of audioPresence metadata, audioContent metadata, or audioObject metadata. For example, a dependency relationship exists between the audioPresence metadata and the audioContent metadata, or a dependency relationship exists between the audioContent metadata and the audioObject metadata.

In some embodiments, a dynamic metadata portion of the first audio metadata is obtained from a dynamic metadata module, and a static metadata portion of the first audio metadata is obtained from a static metadata module. For example, the dynamic metadata portion of the first audio metadata comprises the audioBlockFormat metadata; the static metadata portion of the first audio metadata comprises the audioChannelFormat metadata.

In step 120, second audio metadata of the audio signal not comprised in the ADM is obtained, wherein the second audio metadata corresponds to a second metadata portion. For example, the second audio metadata that is obtained by a second data management module is stored in a second metadata portion, wherein the second data management module is different from the first data management module. For example, the second metadata portion is a customizable and extendable <bdext> chunk for new configurations.

In some embodiments, the first audio metadata comprises base metadata, the first metadata portion comprising a <audioformat Extended> chunk, the second audio metadata comprising extended metadata, and the second metadata portion comprising a <VRext> chunk.

In some embodiments, the base metadata comprises an audio content portion and a control information portion related to an audio signal.

In some embodiments, a portion of the second audio metadata related to audio content is obtained from the first storage area; a portion of the second audio metadata unrelated to audio content is obtained from the second storage area.

In some embodiments, the portion of the second audio metadata unrelated to audio content comprises at least one of audioControl metadata or audioFormat metadata.

In some embodiments, the portion of the second audio metadata related to audio content comprises Presence metadata, instance metadata, or Unit metadata. For example, a dependency relationship exists between the Presence metadata and the instance metadata, and there is an aggregation relationship exists between the Unit metadata and the instance metadata.

In some embodiments, the base metadata comprises at least one of audioPresence metadata, audioContent metadata, or audioObject metadata; the extended metadata comprises at least one of the Presence metadata, the instance metadata, and the Unit metadata.

In some embodiments, a dynamic metadata portion of the second audio metadata is obtained from a dynamic metadata module, and a static metadata portion of the second audio metadata is obtained from a static metadata module. For example, the dynamic metadata portion of the second audio metadata comprises dynamicControl metadata; the static metadata portion of the second audio metadata comprises staticControl metadata.

In some embodiments, the audio signal processing method further comprises a step 130.

In step 130, complete audio metadata of the audio signal is determined based on the first metadata portion and the second metadata portion. For example, the first metadata portion and the second metadata portion are assembled into the complete audio metadata.

In step 140, audio rendering processing is preformed on the audio signal according to the first metadata portion and the second metadata portion. For example, based on the first metadata portion and second metadata portion, complete audio metadata of the audio signal is determined, and an audio rendering process is performed on the audio signal based on the complete audio metadata.

In some embodiments, in response to a data conflict or a data duplication between the first metadata portion and the second metadata portion, first audio metadata causing the data conflict or the data duplication in the first metadata portion is determined as first candidate metadata, and second audio metadata causing the data conflict or the data duplication in the second metadata portion is determined as second candidate metadata; in response to a current data processing mode being a Compatibility mode, the complete audio metadata is obtained by overwriting the second candidate metadata with the first candidate metadata; in response to the current data processing mode is a Custom mode, the complete audio metadata is obtained by overwriting the first candidate metadata with the second candidate metadata.

In some embodiments, in response to a data conflict or a data duplication between the first metadata portion and the second metadata portion, a renderer determines a strategy for resolving the data conflict or the data duplication.

In some embodiments, the complete audio metadata is encapsulated in a metadata structure module and transmitted by a rendering controller module to a rendering engine for audio rendering processing.

Figure 2A:
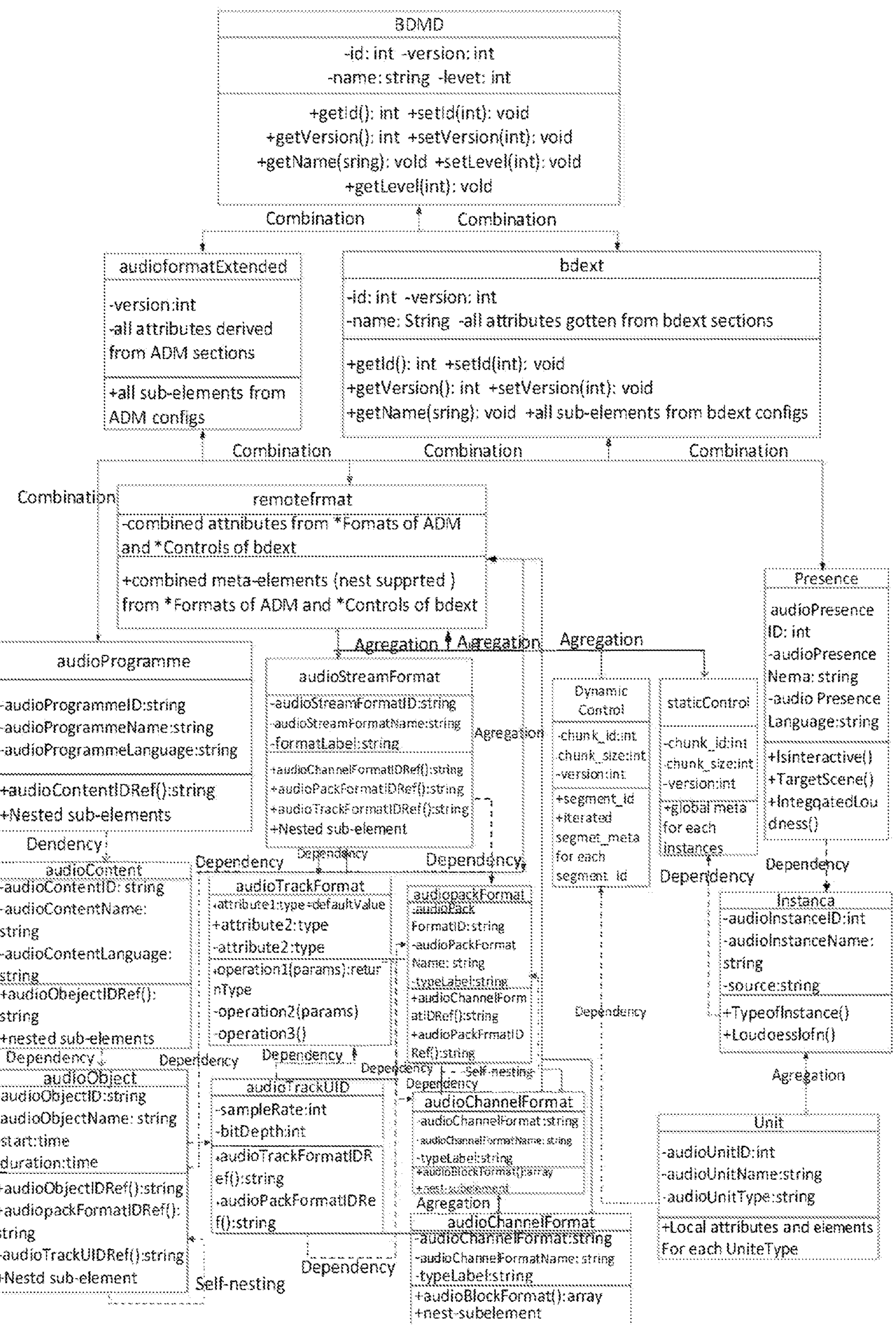
FIG. 2*a* shows a diagram of an audio signal processing method according to some embodiments of the present disclosure.

FIG. 2*a* shows a diagram of an audio signal processing method according to some embodiments of the present disclosure.

As shown in FIG. 2*a*, in order to be compatible with the current mainstream 3D audio metadata, the metadata is designed to be compatible with the ITU-R BS.2076 ADM, wherein content and format attributes and elements are reused to transmit input content and control information related to bed, Object, HOA, Matrix, and Binaural. Based on tests on rendering engines, some compatibility regulations and restrictions are made on the attributes and sub-elements of the 2076 ADM model to make the audio rendering effect controllable. Particular metadata details are shown in FIG. 2.

To achieve extensibility, metadata not available in BS 2076 is provided by extending the <bdext> chunk. Rendering-engine specific metadata is provided in the <bdext> chunk to take advantage of the unique capabilities of the rendering engine in audio production and rendering. Particular metadata details are shown in FIG. 2.

In some embodiments, the metadata elements stored in the <bdext> and <audioformatExtended> sections are complementary, that is, the data segments stored in these two parts do not result in data duplication or data conflict.

In some embodiments, if the metadata elements stored in the <bdext> and <audioformatExtended> parts cause data duplication or data conflict, two strategies can be provided: a Compatibility mode and a Custom mode.

In the Compatibility mode, the configurations in <audioformatExtended> are dominant to overwrite the field configurations in <bdext>; in the Custom mode, the configurations in <bdext> are dominant to overwrite the field configurations in <audioformatExtended>.

Figure 2B:
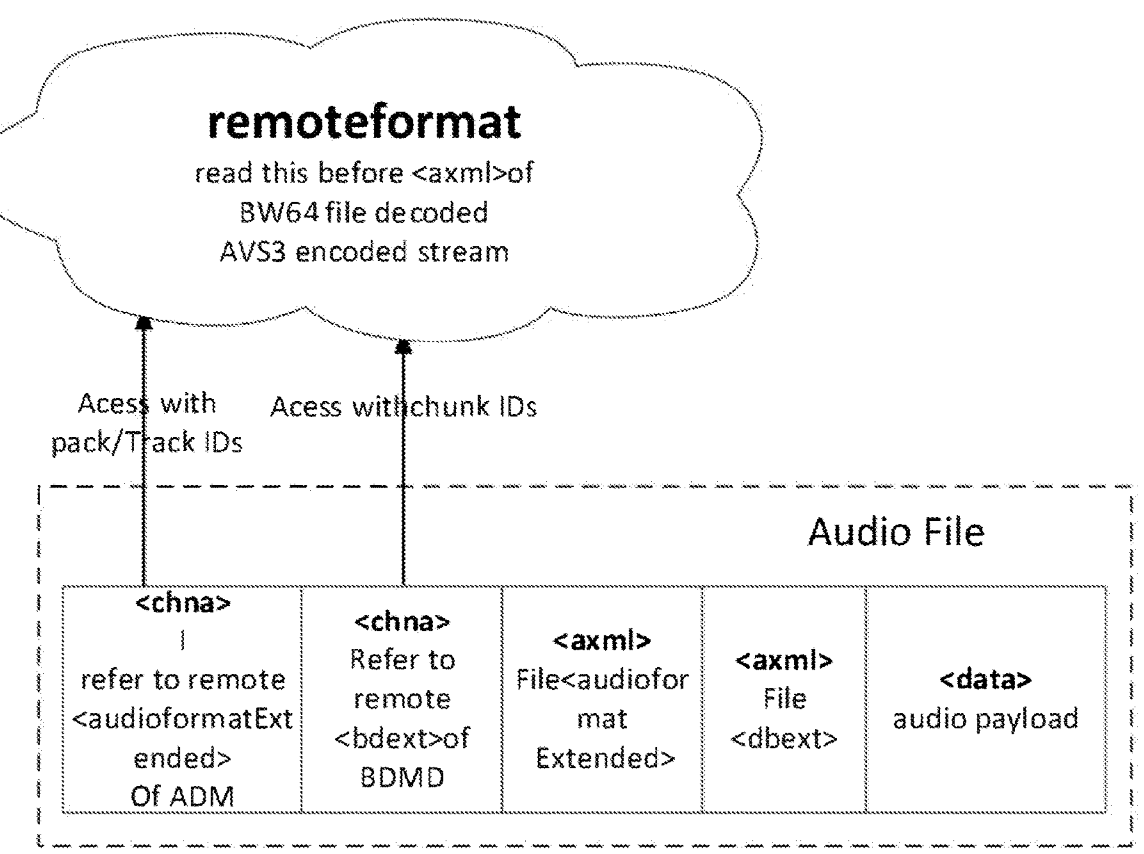
FIG. 2*b* shows a diagram of an audio signal processing method according to other embodiments of the present disclosure.

FIG. 2*b* shows a diagram of an audio signal processing method according to other embodiments of the present disclosure.

As shown in FIG. 2*b*, in order to adapt to the application scenario of cloud rendering, the MD (metadata) system may support cloud storage of some configurations to reduce the size of local files.

For example, the configurations related to "*Format" in <audioformatExtended> do not depend on content, and some "*Format" related to rendering configurations are stored on the Cloud. Metadata unrelated to content in <bdext> can also be decoupled and stored on the Cloud, wherein the metadata unrelated to content is configured and aggregated uniformly in a <remoteformat> module.

Figure 3:
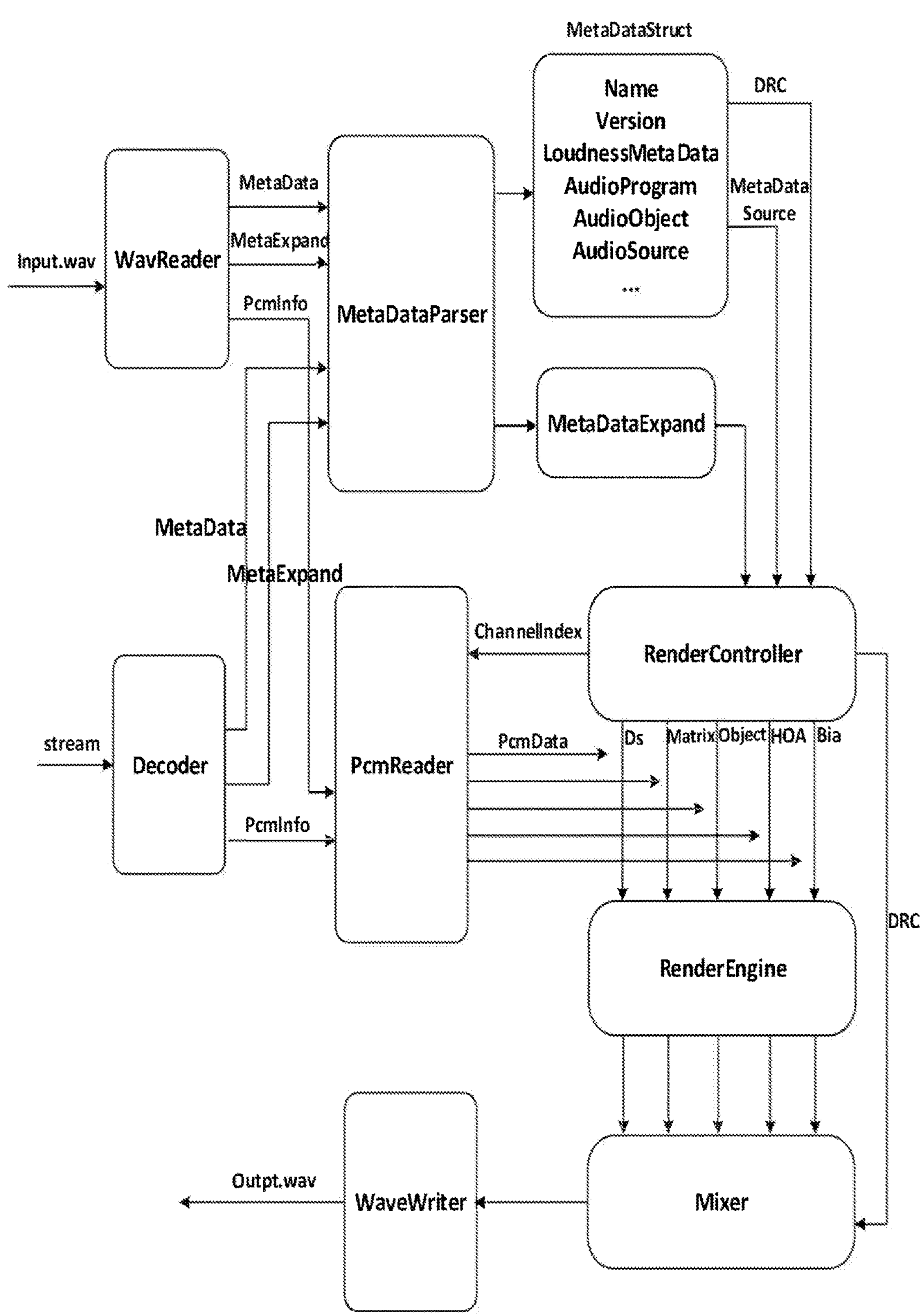
FIG. 3 shows a diagram of an audio signal processing method according to still other embodiments of the present disclosure.

FIG. 3 shows a diagram of an audio signal processing method according to still other embodiments of the present disclosure.

As shown in FIG. 3, the metadata system is combined with a rendering core engine to provide a complete immersive 3D audio content expression system.

In some embodiments, two types of input are supported: BW64 wav and encoded bitstreams. For example, the two bitstream types can be distinguished by "formatLabel"/"formatDefinition" in <audioformatExtended> or "Is_encoded" in <bdext>. The former can be used in scenes where rendering engines work independently, while the latter can be used in complete systems with bitstream encoding and decoding.

In some embodiments, complete audio metadata is assembled from <audioformatExtended> and <bdext>, encapsulated in a MetaDataStructure (metadata structure), and passed to a core RenderEngine (rendering engine) by a RenderController (rendering controller) to complete the rendering of the corresponding audio.

In the above embodiments, a complete backward-compatible (supporting ITU BS 2076) and extensible 3D audio metadata system is provided, which is advantageous for improving the expression ability of 3D spatial audio content, so that a more immersive and realistic spatial audio experience can be provided in combination with self-developed rendering engines.

A layered framework design is proposed, which comprises: separated audio content (content/presence) and audio control (format/control); static metadata (which does not change over time) and dynamic metadata modules being modularized and coexist; common audio control data extracted and stored at the remote end to provide offline update capability.

A metadata system that integrates cloud storage and file storage is also proposed, which can effectively reduce the size of local files, and can effectively reduce network transmission bandwidth requirements when combined with an encoding and decoding system.

Figure 4:
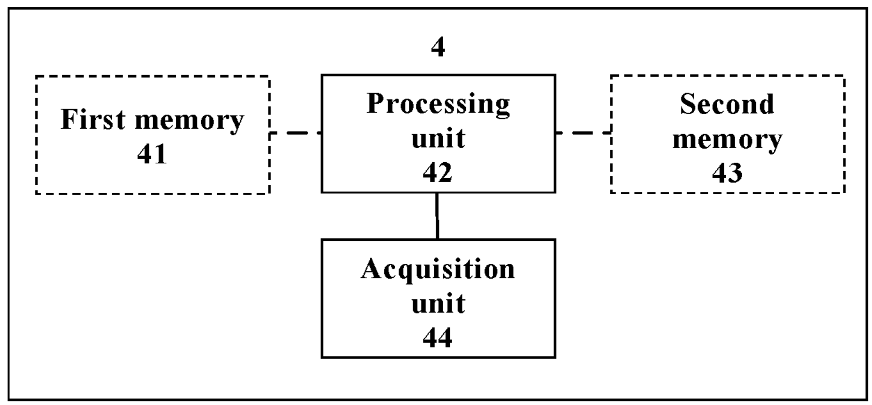
FIG. 4 shows a block diagram of an audio signal processing apparatus according to some embodiments of the present disclosure.

FIG. 4 shows a block diagram of an audio signal processing apparatus according to some embodiments of the present disclosure.

As shown in FIG. 4, the audio signal processing apparatus 4 comprises a first memory 41 and a second memory 43.

In some embodiments, the first memory 41 is used to store first audio metadata of an audio signal that is obtained by a first data management module in a first metadata portion, wherein the first data management module is an ADM module; the second memory 43 is used to store second audio metadata that is obtained by a second data management module in a second metadata portion, wherein the second data management module is different from the first data management module.

In some embodiments, the processing apparatus 4 may further comprise a processing unit 42 (i.e., a processor) for determining complete audio metadata of the audio signal based on the first metadata portion and the second metadata portion.

The memory 41 is used for storing the first audio metadata obtained by a first data management module in a first metadata portion; and storing the second audio metadata obtained by a second data management module in a second metadata portion, wherein the first data management module is an ADM module, and the second data management module is different from the first data management module.

In some embodiments, the memory 41 obtains a portion of the first audio metadata related to audio content from a first storage area; and obtains a portion of the first audio metadata unrelated to audio content from a second storage area. For example, the first storage area is a local storage area, and the second storage area is a remote storage area.

In some embodiments, the remote storage area provides offline update capability for storing a common data portion of audio control metadata.

In some embodiments, the portion of the first audio metadata unrelated to audio content comprises at least one of audioControl metadata or audioFormat metadata.

In some embodiments, the portion of the first audio metadata related to audio content comprises audioPresence metadata, audioContent metadata, or audioObject metadata. For example, a dependency relationship exists between the audioPresence metadata and the audioContent metadata, or a dependency relationship exists between the audioContent metadata and the audioObject metadata.

In some embodiments, the memory 41 obtains a dynamic metadata portion of the first audio metadata from a dynamic metadata module, and obtains a static metadata portion of the first audio metadata from a static metadata module. For example, the dynamic metadata portion of the first audio metadata comprises the audioBlockFormat metadata; the static metadata portion of the first audio metadata comprises the audioChannelFormat metadata.

In some embodiments, the memory 41 obtains a portion of the second audio metadata related to audio content from the first storage area; and obtains a portion of the second audio metadata unrelated to audio content from the second storage area.

In some embodiments, the portion of the second audio metadata that is (obtained by the memory 41 and is) unrelated to audio content comprises at least one of audioControl metadata or audioFormat metadata.

In some embodiments, the portion of the second audio metadata related to audio content comprises Presence metadata, instance metadata, or Unit metadata. For example, a dependency relationship exists between the Presence metadata and the instance metadata, and there is an aggregation relationship exists between the Unit metadata and the instance metadata.

In some embodiments, the memory 41 obtains a dynamic metadata portion of the second audio metadata from a dynamic metadata module, and obtains a static metadata portion of the second audio metadata from a static metadata module. For example, the dynamic metadata portion of the second audio metadata comprises dynamicControl metadata; the static metadata portion of the second audio metadata comprises staticControl metadata.

The processing unit 42 determines complete audio metadata of the audio signal based on the first metadata portion and the second metadata portion.

In some embodiments, in response to a data conflict or a data duplication between the first metadata portion and the second metadata portion, first audio metadata causing the data conflict or the data duplication in the first metadata portion is determined by the processing unit 42 as first candidate metadata, and second audio metadata causing the data conflict or the data duplication in the second metadata portion is determined by the processing unit 42 as second candidate metadata; in response to a current data processing mode being a Compatibility mode, the processing unit 42 obtains the complete audio metadata by overwriting the second candidate metadata with the first candidate metadata; in response to the current data processing mode is a Custom mode, the processing unit 42 obtains the complete audio metadata by overwriting the first candidate metadata with the second candidate metadata.

In some embodiments, the processing unit 42 encapsulates the complete audio metadata in a metadata structure module, and transmits it to a rendering engine by a rendering controller module for audio rendering processing.

In some embodiments, the audio signal processing apparatus 4 comprises: an acquisition unit 44 for acquiring first audio metadata of an audio signal comprised in an Audio Definition Model (ADM), wherein the first audio metadata corresponds to a first metadata portion, and acquiring second audio metadata of the audio signal not comprised in the ADM, wherein the second audio metadata corresponds to a second metadata portion; a processing unit 42 for preforming audio rendering processing on the audio signal according to the first metadata portion and the second metadata portion.

Figure 5:
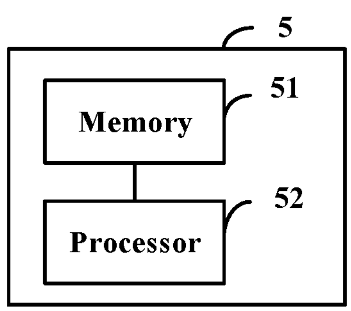
FIG. 5 shows a block diagram of an audio signal processing apparatus according to other embodiments of the present disclosure.

FIG. 5 shows a block diagram of an audio signal processing apparatus according to other embodiments of the present disclosure.

As shown in FIG. 5, the audio signal processing apparatus 5 of this embodiment comprises: a memory 51 and a processor 52 coupled to the memory 51, the processor 52 configured to, based on instructions stored in the memory 51, carry out the audio signal processing method according to any one of the embodiments of the present disclosure.

Wherein, the memory 51 may comprise, for example, system memory, a fixed non-volatile storage medium, or the like. The system memory stores, for example, an operating system, applications, a boot loader, a database, and other programs.

Figure 6:
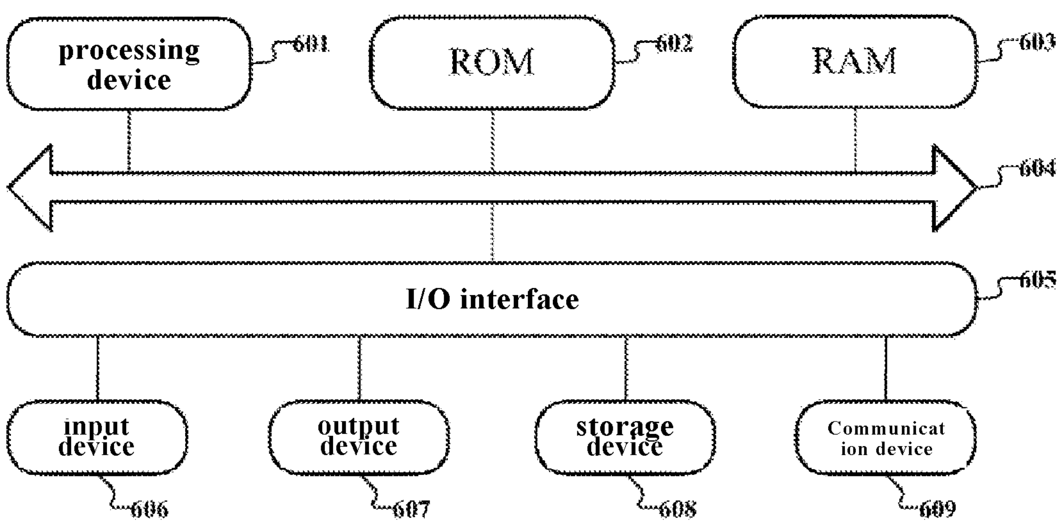
FIG. 6 shows a block diagram of an audio signal processing apparatus according to still other embodiments of the present disclosure.

Referring now to FIG. 6, a structural diagram of an audio signal processing apparatus suitable for implementing the embodiments of the present disclosure is shown. The audio signal processing apparatus of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The audio signal processing apparatus shown in FIG. 6 is merely an example and should not impose any limitation on the function and scope of the embodiments of the present disclosure.

FIG. 6 shows a block diagram of an audio signal processing apparatus according to still other embodiments of the present disclosure.

As shown in FIG. 6, the audio signal processing apparatus may comprise a processing device (e.g., a central processing unit, a graphics processor) 601, which may perform various appropriate actions and processes according to a program stored in Read Only Memory (ROM) 602 or a program loaded from storage device 608 into Random Access Memory (RAM) 603. In RAM 603, various programs and data required for the operation of the electronic device 600 are also stored. Processing device 601, ROM 602 and RAM 603 are connected to each other through bus 604. An input/output (I/O) interface 605 is also connected to the bus 604.

Generally, the following devices can be connected to I/O interface 605: input devices 606 comprising, for example, a touch screen, a touch pad, a keyboard, a mouse, an image sensor, a microphone, an accelerometer, a gyroscope, etc; output devices 607 comprising a liquid crystal display (LCD), a speaker, a vibrator, etc.; a storage device 608 such as a magnetic tape, a hard disk, etc; and a communication device 609. The communication device 609 enables the electronic device 600 to communicate with other devices to exchange data in a wired or wireless manner. Although FIG. 6 shows the electronic device with various components, it should be understood that it is not required to implement or have all of these components. Alternatively, more or fewer components can be implemented or provided.

According to an embodiment of the present disclosure, the processes described above with reference to the flowchart can be implemented as a computer software program. For example, some embodiments of the present disclosure comprise a computer program product comprising a computer program carried on a computer-readable medium, the computer program containing program code for performing the audio signal processing method illustrated in the flowcharts. In such an embodiment, the computer program may be downloaded and installed from the network through the communication device 609, or installed from the storage device 608, or from the ROM 602. When the computer program is executed by the processing device 601, the above functions defined in the audio signal processing method of the embodiment of the present disclosure are performed.

In some embodiments, there is further provided a chip, comprising: at least one processor, and at least one interface for providing computer executable instructions to the at least one processor, wherein the at least one processor is used to execute the computer executable instructions to implement the audio signal processing method according to any of the above embodiments.

Figure 7:
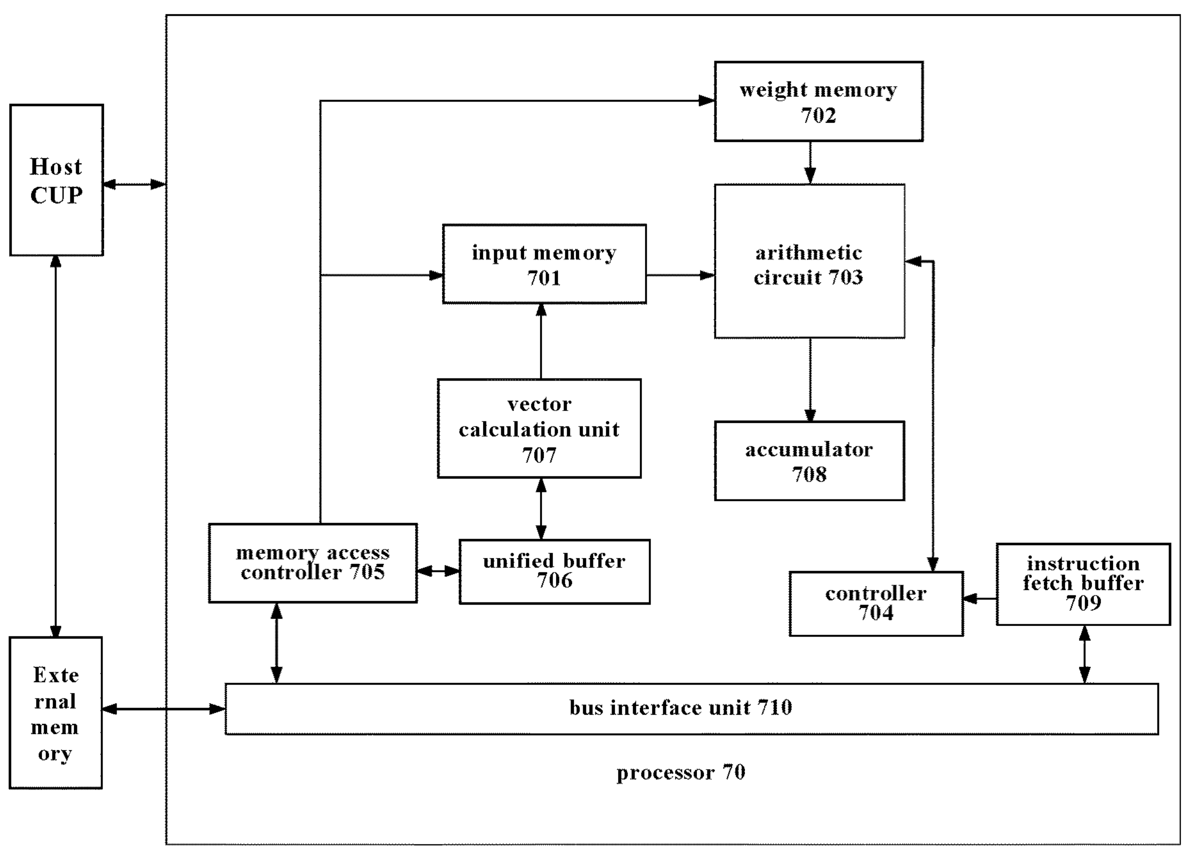
FIG. 7 shows a block diagram of a chip according to some embodiments of the present disclosure.

FIG. 7 shows a block diagram of a chip according to some embodiments of the present disclosure.

As shown in FIG. 7, processor 70 of the chip is mounted as a coprocessor on the host CPU, with its tasks being allocated by the host CPU. The core part of processor 70 is an arithmetic circuit, and controller 704 controls the arithmetic circuit 703 to extract data from memory (weight memory or input memory) and perform operations.

In some embodiments, the arithmetic circuit 703 comprises multiple processing units (PE) internally. In some embodiments, the arithmetic circuit 703 is a two-dimensional systolic array. The arithmetic circuit 703 can also be a one-dimensional systolic array or other electronic circuits capable of performing mathematical operations such as multiplication and addition. In some embodiments, the arithmetic circuit 703 is a general-purpose matrix processor.

For example, suppose there is an input matrix A, a weight matrix B, and an output matrix C, the arithmetic circuit fetches data of matrix B from the weight memory 702 and catches the data on each PE of the arithmetic circuit. The arithmetic circuit fetches data of matrix A from the input memory 701 and performs matrix operations on the data of matrices A and B. The intermediate or final result of the matrix obtained is stored in the accumulator 708.

The vector calculation unit 707 can perform further operations on the output of the arithmetic circuit, such as vector multiplication, vector addition, exponential operation, logarithmic operation, size comparison, etc.

In some embodiments, the vector calculation unit 707 store the processed output vectors in unified buffer 706. For example, the vector calculation unit 707 can apply nonlinear functions to the output of the arithmetic circuit 703, such as a vector of accumulated values, to generate activation values. In some embodiments, the vector calculation unit 707 generates normalized values, combined values, or both. In some embodiments, the processed output vector can be used as an activation input to the arithmetic circuit 703, for example, for use in subsequent layers in neural networks.

The unified memory 706 is used to store input data and output data.

The memory access controller 705 (DMAC) transfers input data from external memory to input memory 701 and/or unified memory 706, stores weight data from external memory in weight memory 702, and stores data from unified memory 706 in external memory.

Bus Interface Unit (BIU) 510 is used for the interaction between the host CPU, the DMAC, and instruction memory 709 through the bus.

The instruction fetch buffer 709 connected to controller 704 is used to store instructions used by the controller 704;

Controller 704 is used to call instructions cached in memory 709 and control the operation process of the operation accelerator.

Generally, the unified memory 706, input memory 701, weight memory 702, and instruction memory 709 are all On Chip memory, and the external memory is memory external to the NPU. The external memory can be Double Data Rate Synchronous Dynamic Random Access Memory (DDR SDRAM), High Bandwidth Memory (HBM), or other readable and writable memory.

In some embodiments, there is further provided a computer program, comprising: instructions that, when executed by a processor, cause the processor to perform the audio signal processing method of any embodiment of the present disclosure.

Figure 8:
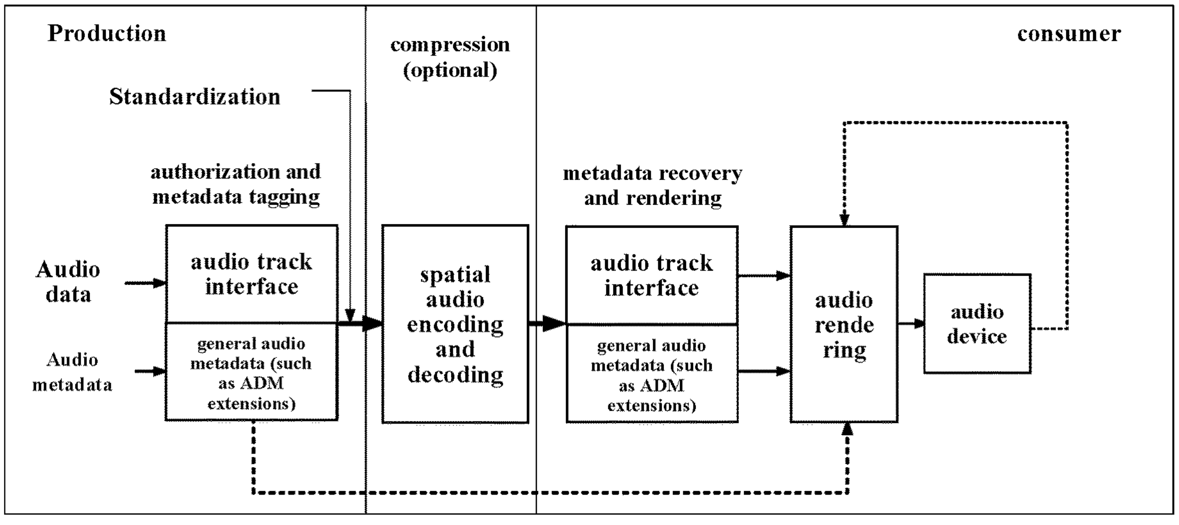
FIG. 8 shows a schematic diagram of an audio signal processing procedure according to some embodiments of the present disclosure.

FIG. 8 shows a schematic diagram of an audio signal processing procedure according to some embodiments of the present disclosure.

As shown in FIG. 8, on the production side, authorization and metadata tagging are carried out using audio track interfaces and general audio metadata (such as ADM extensions) based on audio data and audio source (metadata?) data. For example, standardization can also be carried out.

In some embodiments, the processing result on the production side is subjected to spatial audio encoding and decoding to obtain a compression result.

On the consumer side, based on the processing result (or compression result) from the production side, metadata recovery and rendering processing are carried out using audio track interfaces and general audio metadata (such as ADM extensions, etc.); the processing result is subjected to an audio rendering process and is then input to an audio device.

In some embodiments, the input of audio processing may comprise scene information and metadata, target-based audio signals, FOA (First Order Ambitonics), HOA (High Order Ambitonics), stereo, surround sound, etc; the input (output) of audio processing comprises a stereo audio output, etc.

Those skilled in the art should understand that embodiments of the present disclosure can take the form of an entirely hardware embodiment, an entirely software embodiment or an embodiment containing both hardware and software elements. When implemented in software, the above embodiment can be implemented in whole or in part in the form of a computer program product. The computer program product comprises one or more computer instructions or computer programs. The computer instructions or computer programs, when loaded and executed on a computer, can generate in whole or in part the processes or functions according to embodiments of the present disclosure. The computer may be a general purpose computer, a special purpose computer, a computer network, or other programmable device. Moreover, the present disclosure may take the form of a computer program product embodied on one or more computer-usable non-transitory storage media (comprising but not limited to disk storage, CD-ROM, optical storage device, etc.) having computer-usable program code embodied therein.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. An audio signal processing method, comprising:

acquiring first audio metadata of an audio signal comprised in an Audio Definition Model (ADM), wherein the first audio metadata corresponds to a first metadata portion, the first audio metadata comprises base metadata, the first metadata portion comprises a <audioformat Extended> chunk, the second audio metadata comprises extended metadata, and the second metadata portion comprises a <VRext> chunk;

acquiring second audio metadata of the audio signal not comprised in the ADM, wherein the second audio metadata corresponds to a second metadata portion; and preforming audio rendering processing on the audio signal according to the first metadata portion and the second metadata portion.

2. The audio signal processing method according to claim 1, wherein the base metadata comprises an audio content portion and a control information portion related to the audio signal.

3. The audio signal processing method according to claim 1, wherein the preforming audio rendering processing on the audio signal according to the first metadata portion and the second metadata portion comprises:

determining complete audio metadata of the audio signal based on the first metadata portion and second metadata portion; and performing an audio rendering process on the audio signal based on the complete audio metadata.

4. The audio signal processing method according to claim 3, wherein the determining the complete audio metadata of the audio signal based on the first metadata portion and the second metadata portion comprises:

assembling the first metadata portion and the second metadata portion into the complete audio metadata.

5. The audio signal processing method according to claim 3, wherein the determining the complete audio metadata of the audio signal based on the first metadata portion and the second metadata portion comprises:

determining by a renderer a strategy for resolving a data conflict or a data duplication between the first metadata portion and the second metadata portion, in response to the data conflict or the data duplication existing.

6. The audio signal processing method according to claim 5, wherein the determining by the renderer the strategy for resolving the data conflict or the data duplication comprises:

determining first audio metadata causing the data conflict or the data duplication in the first metadata portion as first candidate metadata, and determining second audio metadata causing the data conflict or the data duplication in the second metadata portion as second candidate metadata;

obtaining the complete audio metadata by overwriting the second candidate metadata with the first candidate metadata, in response to a current data processing mode being a Compatibility mode; and obtaining the complete audio metadata by overwriting the first candidate metadata with the second candidate metadata, in response to the current data processing mode is a Custom mode.

7. The audio signal processing method according to claim 3, wherein the preforming audio rendering processing on the audio signal according to the first metadata portion and the second metadata portion comprises:

encapsulating the complete audio metadata in a metadata structure module; and transmitting the metadata structure module by a rendering controller module to a rendering engine for audio rendering processing.

8. The audio signal processing method according to claim 1, wherein the acquiring the first audio metadata of the audio signal comprised in the Audio Definition Model (ADM) comprises:

acquiring a portion of the first audio metadata related to an audio content from a first storage area;

acquiring a portion of the first audio metadata unrelated to the audio content from a second storage area;

the acquiring second audio metadata of the audio signal not comprised in the ADM comprises:

acquiring a portion of the second audio metadata related to the audio content from the first storage area; and acquiring a portion of the second audio metadata unrelated to the audio content from the second storage area.

9. The audio signal processing method according to claim 8, wherein the first storage area is a local storage area, and the second storage area is a remote storage area.

10. The audio signal processing method according to claim 9, wherein the remote storage area provides offline update capability for storing a common data portion of audio control metadata.

11. The audio signal processing method according to claim 8, wherein:

the portion of the first audio metadata unrelated to the audio content comprises at least one of audioControl metadata or audioFormat metadata; and the portion of the second audio metadata unrelated to the audio content comprises at least one of audioControl metadata or audioFormat metadata.

12. The audio signal processing method according to claim 8, wherein:

the portion of the first audio metadata related to the audio content comprises at least one of audioPresence metadata, audioContent metadata, or audioObject metadata; and the portion of the second audio metadata related to the audio content comprises at least one of Presence metadata, instance metadata, or Unit metadata.

13. The audio signal processing method according to claim 12, wherein:

a dependency relationship exists between the audioPresence metadata and the audioContent metadata, and a dependency relationship exists between the audioContent metadata and the audioObject metadata; and a dependency relationship exists between the Presence metadata and the instance metadata, and an aggregation relationship exists between the Unit metadata and the instance metadata.

14. The audio signal processing method according to claim 1, wherein:

the base metadata comprises at least one of audioPresence metadata, audioContent metadata, or audioObject metadata; and the extended metadata comprises at least one of Presence metadata, instance metadata, or Unit metadata.

15. The audio signal processing method according to claim 1, wherein the acquiring the first audio metadata of the audio signal comprised in the Audio Definition Model (ADM) comprises:

acquiring a dynamic metadata portion of the first audio metadata and a static metadata portion of the first audio metadata;

the acquiring the second audio metadata of the audio signal not comprised in the ADM comprises:

acquiring a dynamic metadata portion of the second audio metadata and a static metadata portion of the second audio metadata.

16. The audio signal processing method according to claim 15, wherein:

the dynamic metadata portion of the first audio metadata comprises audioBlockFormat metadata, the static metadata portion of the first audio metadata comprises audioChannelFormat metadata; and/or the dynamic metadata portion of the second audio metadata comprises dynamicControl metadata, the static metadata portion of the second audio metadata comprises staticControl metadata.

17. A chip, comprising:

at least one processor, and at least one interface for providing computer executable instructions to the at least one processor, wherein the at least one processor is used to execute the computer executable instructions to implement an audio signal processing method according to claim 2.

18. An audio signal processing apparatus, comprising:

a memory; and a processor coupled to the memory, the processor configured to, based on instructions stored in the memory, carry out an audio signal processing method comprising:

acquiring first audio metadata of an audio signal comprised in an Audio Definition Model (ADM), wherein the first audio metadata corresponds to a first metadata portion, and the first audio metadata comprises base metadata, the first metadata portion comprises a <audioformat Extended> chunk;

acquiring second audio metadata of the audio signal not comprised in the ADM, wherein the second audio metadata corresponds to a second metadata portion, and the second audio metadata comprises extended metadata, and the second metadata portion comprises a <VRext> chunk; and preforming audio rendering processing on the audio signal according to the first metadata portion and the second metadata portion.

19. A non-transitory computer-readable storage medium on which a computer program is stored, the program when executed by a processor implementing an audio signal processing method comprising:

acquiring first audio metadata of an audio signal comprised in an Audio Definition Model (ADM), wherein the first audio metadata corresponds to a first metadata portion, and the first audio metadata comprises base metadata, the first metadata portion comprises a <audioformat Extended> chunk;

acquiring second audio metadata of the audio signal not comprised in the ADM, wherein the second audio metadata corresponds to a second metadata portion, and the second audio metadata comprises extended metadata, and the second metadata portion comprises a <VRext> chunk; and preforming audio rendering processing on the audio signal according to the first metadata portion and the second metadata portion.

* * * * *